C. J. SCHROEDER.
DROP FRAME CART.
APPLICATION FILED OCT. 2, 1914.
1,161,256.
Patented Nov. 23, 1915.
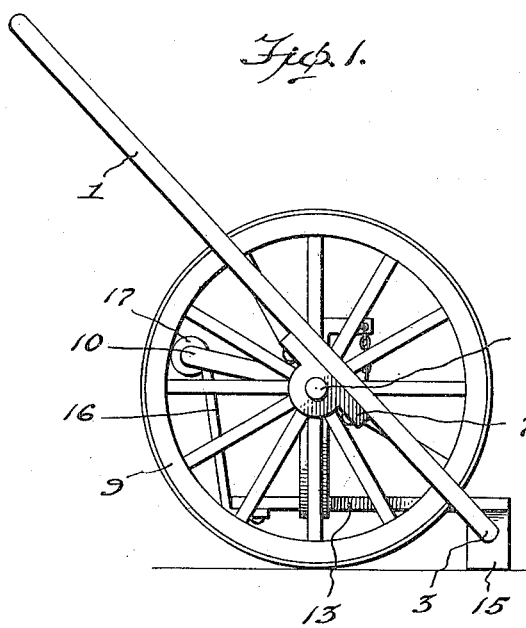
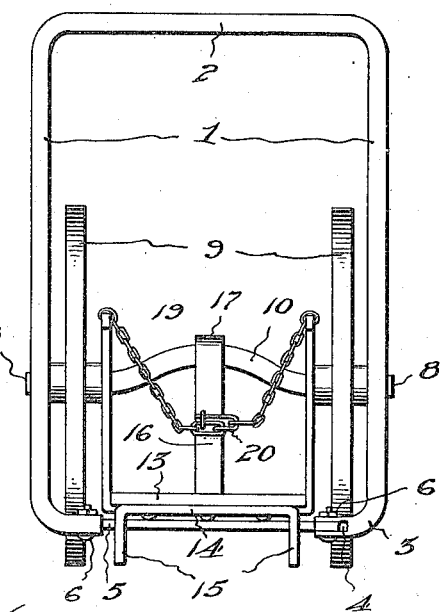
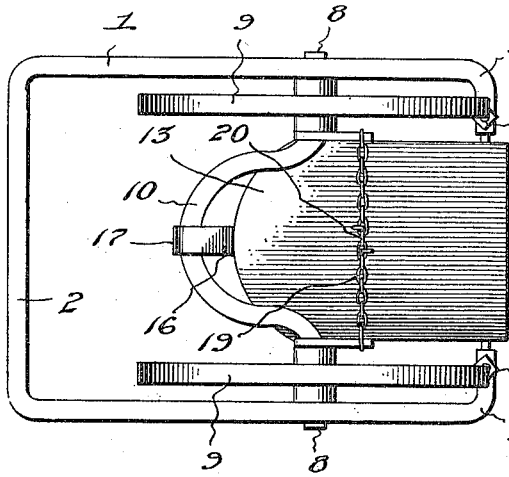
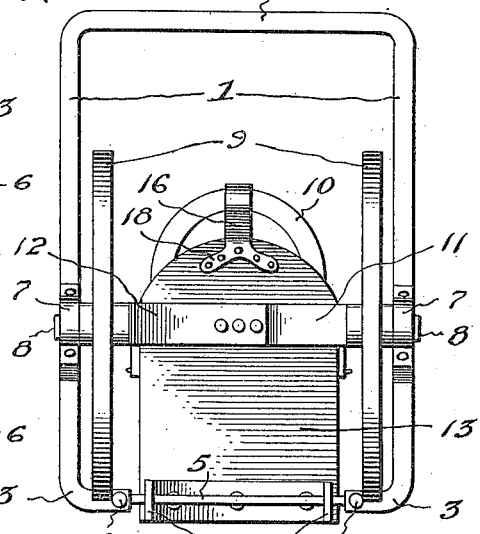
Witnesses
Paul M. Hunt
G. W. Michael, Jr.
Inventor
Conrad J. Schroeder
By Edson Bros.
Attorney

UNITED STATES PATENT OFFICE.

CONRAD J. SCHROEDER, OF KANSAS CITY, MISSOURI, ASSIGNOR OF ONE-HALF TO JOHN G. DEERY, OF KANSAS CITY, MISSOURI.

DROP-FRAME CART.

1,161,256.      Specification of Letters Patent.    Patented Nov. 23, 1915.

Application filed October 2, 1914. Serial No. 864,646.

*To all whom it may concern:*

Be it known that I, CONRAD J. SCHROEDER, a citizen of the United States, residing at Kansas City, in the county of Jackson and State of Missouri, have invented certain new and useful Improvements in Drop-Frame Carts; and I do hereby declare the following to be a full, clear, and exact description of the invention, such as will enable others skilled in the art to which it appertains to make and use the same.

This invention is a push cart or carrier for use in transporting receptacles such as are employed in street cleaning, the transportation of household refuse cans and the like, although it is equally adaptable for other uses.

The object of the invention is to produce a drop platform portable carrier of few parts, which will be light, strong and durable, and which will be inexpensive to manufacture, and which is adapted to transport receptacles which may be conveniently placed on the carrier.

The invention consists in the combination and arrangement of parts which will permit of quick repair of a device in the event of fracture or injury to any of its parts, as will be more fully understood from the detailed description of the invention hereinafter set forth.

One embodiment of the invention is illustrated in the accompanying drawings, but it is to be understood that the disclosure therein made is not to be construed as defining the limits of the invention.

In the drawings: Figure 1 is a side elevation of a carrier. Fig. 2 is a front elevation thereof. Fig. 3 is a top plan view. Fig. 4 is a bottom plan view.

The cart or carrier illustrated in the drawings is of the drop frame type wherein the platform is maintained on a plane close to the road surface to facilitate the placing of refuse cans thereon. In the device shown in the drawings, a frame is provided which is shown substantially U-shaped. This frame may be made of tubular metal if desired, and consists of the sides 1 and handle 2 constructed of a continuous piece of metal. The sides 1 may be bent inwardly at 3, and may be slotted as at 4 to permit of the insertion of a removable member 5, which may be bolted to the frame ends 3 by any suitable means such as at 6. This removable section 5 when applied to the U-shaped frame, forms a substantially rectangular closed frame.

A suitable axle member is mounted upon the U-shaped frame, and is shown retained in proper position by trunnions 7 secured to the frame, said axle member having outwardly extending pinions 8 which engage the trunnions 7 and also serve as axles for the wheels 9. From the trunnions, the axle is shown extending rearwardly to form a support for a receptacle. This rearward extension may be arcuate in form, as illustrated at 10 in the drawings, although the form of the extension may be changed to suit the needs of the carrier. The wheels 9 are shown mounted on the pinions 8 and within the frame, but it is obvious that the wheels may be placed exteriorly of the frame. In the construction shown, the wheels are maintained in position within the frame and a plurality of depending angular straps 11, 12, are suspended from the pinions 8, and between the wheels, one of said straps 12 being shown in Fig. 4 as overlapping the strap 11. Said straps are provided with means whereby they may be adjusted and secured with relation to each other to receive platforms 13 of various sizes.

The platform is preferably secured to the straps at about the central portion thereof, while the forward end of the platform is provided with a support 14 which is shown having a plurality of depending arms 15. These arms 15 are designed to serve as means to maintain the frame and platform in their proper positions when the cart or carrier is brought to rest, the arms 15 cooperating with the wheels in supporting the framework and platform.

If desired, the platform 13 may be further supported from the axle member by a rearward depending strap 16. This strap 16 is shown provided with a hooked upper end 17, and with a bifurcated lower end 18. The platform 13 is slidably mounted upon the removable member 5 of the frame, and as the trunnions 7 are removably mounted upon the sides 1 of the frame, the platform 13, its support 14, and the wheels, may be readily detached from the frame 1 and the parts thereafter detached from each other to facilitate repairs when necessary, or packing parts in a small space, as for shipment. The upper ends of the straps 11 and 12 may be perforated at about the central portion thereof to apply the ends of a flexible retaining member, such as a chain 19, said chain being shown as having a drawlink 20 to firmly retain a receptacle on the platform 13.

It will be observed that the device comprises but few parts, that the platform is firmly and rigidly retained in position by removable means; that the handle 2 may be inclined to suit the position of the operator, and that the parts are so balanced that when the handles are released the cart frame will move forward until the arms 15 are brought into engagement with the road surface, whereupon the platform will assume a substantially level position and the cart will be maintained in its upright position through the contact of these wheels and the arms 15, with the road surface.

It is obvious that minor changes in the form and proportion of parts may be made without departing from the spirit of the invention, and the right is reserved to make such changes as fairly fall within the scope of the appended claims.

It will be noted that the arms 15 perform three functions, *i. e.* first, they support the forward end of the platform; second, serve as a partial base for the cart when it is at rest, with or without a load; third, to act as a brake to prevent the cart from being moved carelessly or accidentally from a position in which it has been placed.

Having thus described my invention, what I claim as new and desire to secure by Letters Patent is:

1. In a vehicle of the class described, a frame, an axle member mounted thereon and carrying a plurality of wheels, a platform and a platform support, said support having a depending arm to coöperate with the wheels in maintaining the vehicle in an upright position when at rest and a strap depending from the rear portion of said axle member to engage said platform.

2. In a vehicle of the class described, a substantially U-shaped frame, a removable member connected with the terminals of said frame, an axle member mounted on the frame and carrying a plurality of wheels, a platform, and a platform support carried by the removable member of the frame, said support having a plurality of depending arms adapted to engage the road surface when the vehicle is at rest.

3. In a vehicle of the class described, a substantially U-shaped frame, a removable member carried by said frame, an axle member removably mounted on the frame and carrying a plurality of wheels, said axle member extending inwardly from the frame and having a rearwardly extended portion adapted to serve as a support for a receptacle, a platform, and means to support the same, said platform supporting means being carried by the removable member of the frame.

4. In a vehicle of the class described, a frame, an axle member mounted on the frame, said axle member having a rearwardly extended portion adapted to serve as a support for a receptacle, a platform support carried by the frame, a platform secured thereto, and a strap depending from the extended portion of the axle to serve as a rear support for said platform.

5. In a vehicle of the class described, a frame, an axle member mounted on the frame, said axle member having a rearwardly extended portion adapted to serve as a support for a receptacle, a platform support carried by the frame, a platform secured thereto, a hanger strap depending from the axle member for said platform, and a strap extending from the rearwardly extended portion of the axle member to serve as a rear support for said platform.

6. In a vehicle of the class described, a frame, an axle member mounted on the frame, said axle member having a rearwardly extended portion adapted to serve as a support for a receptacle, a platform member carried by the frame, a platform secured thereto, a hanger strap depending from said axle member for said platform, and a strap extended from the rear of said extended portion of the axle member to serve as a rear support for said platform, said strap being detachably secured to the axle and having a bifurcated lower end removably secured to the platform.

In testimony whereof, I affix my signature, in presence of two witnesses.

C. J. SCHROEDER.

Witnesses:
 FREDERICKA D. PERRY,
 JAY C. CALHOUN.